United States Patent [19]

Liu et al.

[11] Patent Number: 5,489,649
[45] Date of Patent: Feb. 6, 1996

[54] STAR-BRANCHED POLYMERS AND FUNCTIONAL FLUIDS PREPARED THEREFROM

[75] Inventors: Wan-Li Liu; Frederick C. Loveless, both of Yardley, Pa.

[73] Assignee: Mobil Oil Corporation, Fairfax, Va.

[21] Appl. No.: 242,988

[22] Filed: May 16, 1994

[51] Int. Cl.⁶ .................................................. C08F 257/02
[52] U.S. Cl. ..................... 525/193; 525/242; 525/271; 525/316
[58] Field of Search .................................... 525/193, 316, 525/242, 271

[56] References Cited

U.S. PATENT DOCUMENTS 3,318,813  5/1967  McCormick et al. .................... 252/59

OTHER PUBLICATIONS

Eschevey et al "Star Polymers from styrene and divinylbenzene." *Polymer*, vol. 16 (1975), pp. 180–184.
Sutz et al "New developments in star polymer synthesis." *Makromol. Chem.*, vol. 189 (1988), pp. 1051–1060.

*Primary Examiner*—Vasu S. Jagannathan
*Attorney, Agent, or Firm*—A. J. McKillop; M. D. Keen

[57] ABSTRACT

Novel star-branched polymers in which the arms are each a polymer of an anionically polymerizable monomer consisting of monoethylenically unsaturated compounds comprising p-tert-butylstyrene (t-BS) coupled with a polyalkenyl coupling agent. Certain of the foregoing star-branched polymers, e.g., wherein the arms are a homopolymer of t-BS and the coupling agent is divinylbenzene (DVB), are useful as additives to functional fluids, particularly hydrocarbon lubricating oils, for the purpose of improving their viscometric properties.

5 Claims, No Drawings

STAR-BRANCHED POLYMERS AND FUNCTIONAL FLUIDS PREPARED THEREFROM

BACKGROUND OF THE INVENTION

This invention relates to star-branched polymers the arms of which contain segments of polymerized p-tert-butylstyrene (t-BS) and the use of such polymers as additives for improving the viscometric properties of functional fluids, e.g., lubricating oils.

Information Disclosure Statement Including Description of Related Art

The following information is being disclosed under the provisions of 37 CFR 1.56, 1.97 and 1.98.

Functional fluids such as lubricating oils often contain a dissolved polymer for the purpose of improving their viscosity index (VI) and/or thickness. In general, various types of straight chain homopolymers, and random and graft copolymers, and branched polymers, e.g., highly branched copolymers such as star-branched polymers, have been used for this purpose. While these prior art polymers are satisfactory for many applications, polymers which exhibit even better properties such as thickening power and viscosity index improvement under various circumstances would be very desirable.

The following prior art references show aspects of the use of polymers as viscosity index improvers in functional fluids, and the preparation of branched polymers from monofunctional monomers such as styrene and multifunctional coupling and cross-linking agents such as divinylbenzene.

U.S. Pat. No. 3,318,813, issued May 9, 1967 to McCormick et al., discloses polymers of alkylstyrenes, e.g., tert-butylstyrene, as additives for improving the viscosity index of lubricating oils. There is no suggestion in this patent of the production or use of any star-branched polymers.

U.S. Pat. No. 3,752,794, issued Aug. 14, 1973 to Bacakal, discloses copolymers of p-tert-butylstyrene with a nitrogen-containing comonomer prepared by free radical polymerization, used as viscosity index improving dispersants in lubricating oils. There is no suggestion in this patent of any star-branched polymers.

U.S. Pat. No. 3,985,830, issued Oct. 12, 1976 to Fetters, teaches star-branched polymers produced by anionic polymerization and containing at least three arms of a copolymer of butadiene and styrene or isoprene and styrene, or a homopolymer of butadiene, isoprene, or styrene radiating from a nucleus composed of at least two molecules of a linking compound such as divinylbenzene (DVB). There is no suggestion in this patent of the preparation of a star-branched polymer having segments of a polymer of p-tert-butylstyrene (t-BS).

U.S. Pat. No. 4,116,917, issued Sep 26, 1978 to Eckert, discloses as a viscosity index improver a hydrogenated star-shaped polymer comprising a poly-alkenyl coupling agent nucleus and at least four polymeric arms linked to the nucleus wherein the arms are hydrogenated homopolymers and copolymers of conjugated dienes, or hydrogenated copolymers of conjugate dienes and monoalkenyl arenes such as tertiary butylstyrene, or mixtures thereof.

U.S. Pat. No. 4,849,481, issued Jul. 18, 1989 to Rhodes et al., discloses a star-branched polymer useful as a polymeric VI improver comprising at least one arm which is a block copolymer made up of a polymerized conjugated diolefin block and a polymerized monoalkenyl hydrocarbon block, and a plurality of arms which are either homopolymers of a conjugated diolefin or a copolymer of two or more conjugated diolefins.

Pending application Ser. No. 08/038,307, filed Mar. 29, 1993 by Liu et al. discloses and claims comb graft copolymers in which the backbone is a homo- or copolymer of p-methylstyrene and the arms are each a homo- or copolymer of p-tert-butylstyrene (t-BS). The polymer may be used as a viscosity index improver and thickener for functional fluids, e.g., lubricating oils.

Pending application Ser. No. 08/149,449, filed Nov. 9, 1993 by Loveless et al. discloses and claims concentrates in a base stock oil of a highly branched polymer containing polymerized t-BS prepared by the free radical polymerization of a monomer comprising t-BS and a multifunctional compound such as divinylbenzene (DVB) which are dissolved in the base stock oil. The resulting concentrate may be diluted with the same or a different base stock oil to obtain a functional fluid, e.g., a lubricating oil.

SUMMARY OF THE INVENTION

In accordance with this invention, star-branched polymers are provided, the arms of which are each a polymer of a monomer consisting of anionically polymerizable monoethylenically unsaturated compounds comprising p-tert-butylstyrene (t-BS), coupled with a polyalkenyl coupling agent. The star-branched polymer may be prepared by the anionic solution polymerization of monomer consisting of monoethylenically unsaturated (monofunctional) compounds including t-BS and optionally, one or more additional anionically polymerizable monofunctional monomers, to form a living polymer of such monomer in the form of anions. The living polymer anions are then reacted with a polyalkenyl coupling agent, e.g., divinylbenzene (DVB), to form the star-branched polymer.

In accordance with another aspect of the invention, certain of the foregoing star-branched polymers, e.g., wherein the polyalkenyl coupling agent is DVB and the arms are a polymer of t-BS, are useful as additives to functional fluids, particularly hydrocarbon lubricating oils, for the purpose of improving their viscosity index and relative thickness.

DETAILED DESCRIPTION OF THE INVENTION

The monoethylencially unsaturated, i.e., monofunctional monomer utilized to form the living polymer anions which are the precursor of the arms of the star-branched polymer of this invention may consist entirely of t-BS or may comprise t-BS and one or more monofunctional anionically polymerizable comonomers. The comonomer, if used, may be a hydrocarbon such as another vinyl aryl compound, e.g. styrene, another ring substituted alkylstyrene wherein the alkyl group is bonded to a ring carbon atom and contains 1–20 carbon atoms, or another substituted styrene such as alpha-methylstyrene.

It is preferred that the t-BS be present in an amount of at least 50 wt. % of the total monofunctional monomer. Thus if a comonomer is used, it may be present in an amount, for example, of about 1 to 50 wt. %, preferably about 1 to 25 wt. % based on the weight of total monomer. In any specific polymerization utilizing a comonomer, the identity and amount of the comonomer should be such that the resulting star-branched polymer is soluble in the base stock oil with which it is contemplated to be mixed in the formulation of a functional fluid.

The living polymer anions of monofunctional monomer which are the precursors of the arms of star-branched polymers of this invention are prepared by an anionic polymerization process. Anionic polymerization is well known in the art, and it is utilized in the production of a variety of commercial polymers. An excellent comprehensive review of the anionic polymerization processes appears in the text ADVANCES IN POLYMER SCIENCE 56, ANIONIC POLYMERIZATION, pp. 1–90, Springer-Verlag, Berlin, Heidelberg, New York, Tokyo 1984 in a monograph entitled ANIONIC POLYMERIZATION OF NON-POLAR MONOMERS INVOLVING LITHIUM, by R. N. Young, R. P. Quirk and L. J. Fetters, incorporated herein by reference. The anionic polymerization process is conducted in the presence of a suitable anionic catalyst (also known as an initiator), such as n-butyllithium, sec-butyllithium, t-butyllithium, sodium naphthalide or cumyl potassium. The amount of the catalyst and the amount of the monomer in the polymerization reaction dictate the molecular weight of the living polymer. The polymerization reaction is conducted in solution using an inert solvent as the polymerization medium, e.g., aliphatic hydrocarbons, such as pentane, hexane, cyclohexane or heptane, or aromatic solvents, such as benzene or toluene.

In some instances it may be advantageous to carry out the anionic polymerization process to produce the living polymer anions and the subsequent coupling reaction to produce the star-branched polymer in a relatively non-volatile base stock oil as solvent which is suitable as part or all of the base stock oil contemplated to be present in a subsequently prepared functional fluid in which the star-branched polymer serves as a thickener and viscosity index improver. Such a base stock oil may be any of the natural or synthetic oils disclosed hereinafter as suitable for functional fluids, and a polymerization and coupling process in which the oil is used as a solvent yields a polymer concentrate as product which can be diluted with a base stock oil, such diluent oil being the same or different from the oil used as solvent to obtain the desired functional fluid.

In carrying out the anionic polymerization process to produce the living polymer anions of monofunctional monomer, the monomer is dissolved in the solvent and the anionic catalyst is added to initiate the reaction. The reaction time and temperature for the anionic polymerization are not critical and may vary widely, for example from ½ to 50 hours, preferably 1 to 30 hours, at from 0° C. to 100° C. or higher, preferably from 18° C. to 60° C. Ordinarily the time and temperature are roughly inversely related. The amount of anionic catalyst added is such that the molar ratio of total monomer to catalyst multiplied by the molecular weight of the monomer yields the approximate number average molecular weight of the living polymer at the conclusion of the polymerization. The reaction pressure is not critical and may vary, for example, from atmosphere to 100 psig. The mixture is generally agitated during the polymerization.

After the anionic polymerization to produce the living polymer anions of monofunctional monomer is completed, i.e., all the monomer has been polymerized, the polyalkenyl coupling agent is added to initiate the coupling reaction which is generally carried out under conditions of temperature and pressure similar to those employed in the initial anionic polymerization reaction for a period of about 0.1 to 24 hours, preferably about 1 to 4 hours, after which the reaction may be terminated by adding a proton donor such as acetic acid. However, before the termination of the coupling reaction by the addition of a proton donor, the number of arms of the star-branched polymer and thus its viscosity index raising capability and thickening power may be substantially increased if desired, by adding to the reaction mix a fresh amount of monofunctional monomer and continuing the resulting second stage of anionic polymerization until the desired characteristics of the polymer are obtained. The reaction may then be terminated by the addition of a proton donor. The quantity of monofunctional monomer added and the temperature and time of reaction for the second stage of anionic polymerization may be, for example, within the ranges defined previously for the initial anionic polymerization stage.

The polyalkenyl coupling agent is preferably a hydrocarbon. Coupling agents which may be used are, for example, 1,2-divinylbenzene, 1,3-divinylbenzene, 1,4-divinylbenzene, 1,2,4-trivinylbenzene, 1,3-divinylnaphthalene, 1,8-divinylnaphthalene, 1,2-diisopropenylbenzene, 1,3-diisopropenylbenzene, 1,4-diisopropenylbenzene, 1,3,5-trivinylnaphthalene, 2,4-divinylbiphenyl, 3,5,4'-trivinylbiphenyl, 1,2-divinyl-3,4-dimethylbenzene, 1,5-6-trivinyl-3,7-diethylnaphthalene, 1,3-divinyl-4,5,8-tributylnaphthalene, and 2,2'-divinyl-4-ethyl-4'-propylbiphenyl. Divinylbenzene, in either its ortho, meta or paro isomer or mixtures thereof is preferred as the polyalkenyl coupling agent.

The polyalkenyl coupling agent is present in an amount sufficient to bring about a sufficient number of arms of the star-branched polymer so as to significantly raise its relative thickening power (RTP) in a functional fluid subsequently prepared containing the polymer without however causing such a large number of arms that the polymer becomes substantially insoluble in the base stock oil of the functional fluid at the desired concentration. The amount of coupling agent may be such that the molar ratio of living polymer anions to coupling agent is in the range, for example of about 1 to 24, preferably about 3 to 6.

After the coupling reaction is terminated by addition of a proton donor such as acetic acid, the polymer may be isolated by conventional means, e.g., by pouring the polymerization solution into a precipitant such as isopropanol to precipitate the polymer, filtering and drying. Alternatively, if a relatively volatile polymerization solvent was employed such as cyclohexane, the polymerization solution may be mixed with a predetermined amount of a base stock oil suitable for utilization in a functional fluid, and the volatile polymerization solvent evaporated to obtain a polymer concentrate in the base stock oil which can be subsequently diluted with the same or a different base stock oil to obtain a functional fluid. Finally, as stated previously, the anionic polymerization and coupling reactions can be carried out using a base stock oil as solvent to obtain directly a polymer concentrate in the base stock oil as solvent. Again, such concentrate can be diluted with the same or a different base stock oil to obtain a functional fluid.

Depending on the anionic polymerization and coupling conditions, the star-branched polymer may contain an average of about 3 to 35, preferably about 3 to 20 arms per molecule, and the branches may have a weight average molecular weight ($M_w$) of about 2,500 to 200,000, preferably about 10,000 to 50,000, and a number average molecular weight ($M_n$) of about 2,500 to 200,000 preferably about 10,000 to 50,000 all determined by gel permeation chromatography (GPC). The total molecular weight of the polymer is the sum of the molecular weights of the polyalkenyl coupling agent residue nucleus and the total number of arms present and may be in the range ($M_w$) of about 10,000 to 5,000,000 preferably about 50,000 to 2,000,000, and in the range ($M_n$) of about 10,000 to 5,000,000, preferably about 50,000 to 2,000,000, and the molecular weight distribution (MWD, $M_w/M_n$) of the polymer is in the range, for example, of about 1.00 to 5.00, preferably about 1.00 to 3.00 as determined by GPC.

Many of the star-branched polymers of this invention are particularly useful as additives to functional fluids such as lubricating oils and greases, brake fluids, transmission fluids and hydraulic fluids, for the purpose of increasing their relative thickness and raising their viscosity index (VI).

Advantageously, the star-branched polymer, particularly when it is a hydrocarbon, may be incorporated in a lubricating or other functional fluid medium comprising a base stock oil in the form of either a mineral oil or a synthetic oil, or in the form of a grease in which any of the aforementioned oils are employed as a vehicle. Thus the solid, isolated polymer may be conventionally dissolved in an appropriate amount and type of base stock oil to form a concentrate of the polymer or a finished functional fluid, or a concentrate may be formed by carrying out the anionic polymerization and coupling reactions either directly in a base stock oil, or in a volatile solvent to a solution which is combined with a base stock oil to form a mixture from which the volatile solvent is evaporated, as described previously. Any concentrate which is formed may then be diluted with a base stock oil which is the same or different from that present in the concentrate, to form a functional fluid. In general, base mineral or synthetic oils employed as a lubricant, or grease vehicle, may be of any suitable lubricating viscosity range, as, for example, from about 2 to about 100 centistokes (cSt) and, preferably from about 4 to about 10 cSt at 100° C.

These oils may have viscosity indexes ranging, for example, from about 70 to about 100 using mineral oil base stocks and from about 100 to 200 using synthetic base stocks. The average molecular weights of these oils may range from about 250 to about 2,000. Where the lubricant is to be employed in the form of a grease, the lubricating oil is generally employed in an amount sufficient to balance the total grease composition, after accounting for the desired quantity of the thickening agent, and other additive components to be included in the grease formulation.

In instances where synthetic oils, or synthetic oils employed as the vehicle for the grease, are desired in preference to mineral oils or in combination therewith, various compounds of this type may be successfully utilized. Typical synthetic vehicles include poly(alpha-olefins) (PAO's) such as polybutenes, polyhexenes, and polydecenes, polypropylene glycol, esters such as trimethylol propane esters, neopentylglycol esters, pentaerythritol esters, sebacates, adipates, and phthalates, alkylated diphenyl ethers and alkylated aromatics.

When used as an additive for functional fluids such as lubricating oils, a minor proportion of the star-branched polymer of this invention may be present in the base stock oil, e.g., in an amount of about 0.1 to 20 wt. %, preferably about 0.5 to 5 wt. %. In general, the blending of the base stock oil with a star-branched polymer of this invention has the effect of raising the viscosity index (VI) by an increment in the range of about 50 to 160 such that the final oil blend has a VI in the range, for example, of about 150 to 350, preferably about 175 to 250, (the VI being determined by the method of ASTM D2270) using kinematic viscosities in centistokes (cSt) determined at 40° C. ($KV_{40}$) and 100° C. ($KV_{100}$). The kinematic viscosities of the polymer-containing functional fluid are, for example, about 50 to 2,000 cSt at 40° C. and about 8 to 100 cSt at 100° C. Moreover, certain of the star-branched polymers of this invention have a relative thickening power (RTP) of for example about 2 to 100, preferably about 9 to 20, where RTP is a measure of the thickening efficiency of the polymer relative to PAO-100, a hydrogenated poly(decene-1) having a kinematic viscosity at 100° C. ($KV_{100}$) of 100 cSt. Thus, the amount of PAO-100 required to thicken the base oil to the same viscosity as the blend containing the polymer is calculated by means of the following equation:

$$\log KV_{100} \text{ (blend)} = \frac{x}{100} [2 - \log KV_{100} \text{ of base oil}] + \log KV_{100} \text{ of base oil}$$

where x is the percentage of PAO-100 required to achieve the blend viscosity. The RTP of the polymer is then determined by the equation:

RTP=x/(weight percent of polymer in blend)

The following examples further illustrate the invention.

EXAMPLES 1, 2 AND 3 AND COMPARATIVE EXAMPLES A, B AND C

These examples show the preparation and viscometric properties of star-branched polymers prepared by coupling living homopolymer anions of p-tert-butylstyrene (t-BS) of varying molecular weight with divinylbenzene (DVB, Examples 1, 2, and 3) and, for comparison purposes, the preparation and viscometric properties of linear t-BS homopolymers having molecular weights which are the same as those of the arms of the respective star-branched polymers (Comparative Examples A, B, and C).

To a 250 ml polymerization bottle with Teflon magnetic stirrer was charged 20 grams of t-BS, 0.1 ml of 2.2'-dipyridyl solution (0.1M in cyclohexane) and 145 ml of cyclohexane. The t-butylstyrene and cylohexane had been previously dried and purified by passing them through an aluminum oxide column and a molecular sieve column to remove the inhibitors and residual moisture. A solution of n-butyllithium initiator (1.6M in hexane) was used to titrate the mixture to orange color (endpoint for dryness). Anionic polymerization was then initiated by adding 0.125, 0.25 or 0.50 ml of the 1.6M solution of n-butyllithium. The polymerization was continued for 18 hours at room temperature after which either the polymerization was terminated by injecting a small amount of acetic acid to obtain a linear t-BS homopolymer (Comparative Examples A, B, and C) or the resulting living polymer anions were coupled by adding 0.5 ml of DVB in the form of a composition containing 55 wt. % of DVB meta and para isomers and 43 wt. % ethylvinyl benzene meta and para isomers, with the meta:para ratio of both compounds being 2.3, and the remainder of the composition being diethylbenzene and naphthalene, to obtain a star-branched polymer containing arms of a t-BS homopolymer (Examples 1, 2 and 3). The coupling reaction was continued for 4 hours or longer after which it was terminated by injecting a small amount of dry acetic acid. The polymer solution of each example was then poured into 500 ml of isopropanol to precipitate the polymer which was then filtered and dried overnight in a vacuum oven at 60° C. The polymer of each example was tested as an improver of viscosity index (VI) and thickening power of a synthetic lubricating oil base stock which was a polymerized alpha-olefin (PAO-4), more specifically a hydrogenated polymer of 1-decene having kinematic viscosities at 40° C. of 17.5 cSt and at 100° C. of 4 cSt and a viscosity index (VI) of 128 (ASTM D2270).

Table I shows for each example the amount of anionic polymerization initiator solution employed (An. Pol. Init. Sol.) the theoretical number average molecular weight (Theo. MW) where "M" is 1000, calculated from the amount of t-BS and polymerization initiator employed, and viscometric properties $KV_{40}$, $KV_{100}$, VI and RTP measured from a 5 wt. % solution of the polymer in PAO-4.

TABLE I

| Example | An. Pol. Init. Sol., ml | Theo. MW | $KV_{40}$, cSt. | $KV_{100}$, cSt. | VI | RTP |
|---|---|---|---|---|---|---|
| A | 0.125 | 100 M | 169 | 32.8 | 239 | 13.1 |
| 1 | 0.125 | 100 M/arm | 248.3 | 48.4 | 255 | 15.5 |
| B | 0.25 | 50 M | 125 | 23 | 216 | 10.8 |
| 2 | 0.25 | 50 M/arm | 168.5 | 32.9 | 241 | 13.1 |
| C | 0.50 | 25 M | 51 | 10 | 193 | 5.8 |
| 3 | 0.50 | 25 M/arm | 80 | 17 | 223 | 8.8 |

The results of Table I show that in all cases, star-branched polymers containing arms of a certain molecular weight effect a higher VI and RTP than a linear polymer with a molecular weight the same as the arms of the star-branched polymer.

EXAMPLES 4–7 AND COMPARATIVE EXAMPLE D

These examples show the effect of the use of different (molar) ratios of coupling agent and living polymer anions on the molecular weight and viscometric properties of the resulting star-branched polymers.

The procedure of Examples 1–3 and Comparative Example A was followed except that 20 grams of t-BS, 0.25 ml of initiator solution and, in the case of Examples 4–7, different amounts of DVB were employed to yield varying ratios of DVB to living t-BS polymer anions, the period of anionic polymerization was 14 hours at room temperature and that of the coupling reaction was 6 hours at room temperature. Table II shows the weight average ($M_w$) and number average ($M_n$) molecular weights and molecular weight distribution (MWD) of the polymers obtained determined by gel permeation chromatography, the molar ratios of t-BS living polymer anions to DVB utilized (poly t-BS/DVB), and the viscometric properties of a 5 wt. % solution of each polymer in PAO-4.

EXAMPLE 8

This example illustrates a technique of increasing the number of arms of the star-branched polymer and thus the VI improvement and thickening power which can be effected by the polymer.

The procedure of Example 7 was followed except that instead of terminating the reaction after 6 hours of coupling, a fresh supply of 6.7 grams of t-BS was added and a second stage of anionic polymerization of t-BS was continued for 12 hours at room temperature, after which dry acetic acid was added to terminate the reaction. The polymer had a $M_w$ of 1,325M, a $M_n$ of 920M and a MWD of 1.44, a 5 wt. % solution of the polymer in PAO-4 had a $KV_{40}$ of 155.5 cSt, a $KV_{100}$ of 36.9 cSt and a VI of 280.7 and the RTP of the polymer was calculated to be 13.8. These results indicate that a second stage of anionic polymerization of monofunctional monomer, after the initial coupling reaction, has the capability of producing a polymer having substantially increased viscosity index improving capacity and thickening power.

EXAMPLES 9–11 AND COMPARATIVE EXAMPLE E

The procedure of Examples 4–7 and Comparative Example D was followed except that 113 grams of PAO-4 were used as the polymerization and coupling solvent, the anionic polymerization time was 14 hours and the coupling reaction time was 18 hours, both at room temperature. The viscometric properties of the star-branched polymers of Examples 9–11 and the linear polymer of Comparative Example E exhibited by 5 wt. % solutions in PAO-4 are shown in Table III.

TABLE III

| Example | Poly t-BS/DVB | $KV_{40}$ cSt | $KV_{100}$ cSt | VI | RTP |
|---|---|---|---|---|---|
| E | 0 | 44.5 | 9.1 | 192 | 5.1 |
| 9 | 1:3 | 52.4 | 11.4 | 218 | 6.5 |
| 10 | 1:6 | 74.4 | 15.7 | 226 | 8.5 |
| 11 | 1:12 | 87.7 | 18.6 | 235 | 9.5 |

The results of Table III show that the star-branched polymers of this invention can be prepared using a base stock oil such as PAO-4 as polymerization and coupling solvent to obtain a concentrate of the polymer in the base stock oil, and that such polymers have viscosity index improvement capability and thickening power superior to that of a linear polymer having a molecular weight the same or similar to that of the arms of the star-branched polymer.

TABLE II

| Example | $M_w$ | $M_n$ | MWD | poly t-BS/DVB | $K_{40}$ cSt. | $K_{100}$ cSt. | VI | RTP |
|---|---|---|---|---|---|---|---|---|
| D | 160 M | 124 M | 1.3 | 0 | 50.9 | 10.3 | 96 | 5.9 |
| 4 | 1,053 M | 377 M | 2.79 | 1:3 | 82.7 | 17.6 | 232.5 | 9.2 |
| 5 | 997 M | 380 M | 2.62 | 1:6 | 83.1 | 17.8 | 234.5 | 9.3 |
| 6 | 1,019 M | 500 M | 2.04 | 1:9 | 84.3 | 18.1 | 236 | 9.4 |
| 7 | 1,024 M | 380 M | 2.70 | 1:12 | 82.8 | 17.8 | 234.5 | 9.3 |

The results of Table II show that at varying molar ratios of living polymer anions to coupling agent, star-branched polymers effect a substantially higher VI and RTP than a linear polymer having the same molecular weight as the arms of the star-branched polymer.

EXAMPLES 12–14 AND COMPARATIVE EXAMPLES F–I

These examples are similar to Examples 1–3 and Comparative Examples A-C but using somewhat larger quantities of reagents and a different anionic polymerization initiator.

To a 650 ml polymerization bottle with a magnetic stirrer were charged 60 grams of t-BS, 0.2 ml of 2.2'-dipyridyl solution (0.1M in cyclohexane) and 350 ml of cyclohexane. The t-BS and cyclohexane had been previously dried and purified by passing them through an aluminum oxide column and a molecular sieve column to remove the inhibitors and residual moisture. A solution of sec-butyllithium initiator (1.3M in cyclohexane) was used to titrate the mixture to orange color (endpoint for dryness). Anionic polymerization was then initiated by adding appropriate amount of the 1.3M solution of sec-butyllithium to obtain the desired molecular weight of the living polymer anions. The polymerization was continued for 24 hours at room temperature after which it was terminated with acetic acid to obtain a linear t-BS homopolymer (Comparative Examples F-I) or the living polymer was coupled by injecting a required amount of dry DVB contained in a mixture of DVB, indicator and cyclohexane obtained by titrating the DVB to orange color before adding it to the reactor for coupling, the amount of DVB being such as to obtain a molar ratio of poly (t-BS) anions to DVB of 1:3 (Examples 12–15). The coupling reaction was continued for 24 hours after which it was terminated by injecting a small amount of dry acetic acid. The polymer solution in each example was then poured into 1,000 ml of isopropanol to precipitate the polymer which was then filtered and dried overnight in a vacuum oven at 60° C. The molecular weights were determined by gel permeation chromatography (GPC). The polymers of these examples were tested as an improver of viscosity index (VI) and thickness of PAO-4 synthetic lubricating oil base stock described in Examples 1–3, as measured from a 5 wt. % solution of polymer in the oil. Table IV shows for each example the amount of anionic polymerization initiator solution used, the theoretical and actual molecular weights of the polymer, and the viscometric properties of the oil solution and the polymer using the same headings as in the previous tables, and also shows the approximate average number of arms (No. Arms, approx) of each star-branched polymer of Examples 12–15 as calculated from the actual measured molecular weights.

The data of Table IV shows that star-branched polymers wherein the arms have an actual number average molecular weight of from about 60M to 270M and have viscosity index improving properties and thickening power substantially greater than linear polymers having the same molecular weight as the arms of the star-branched polymer.

Solutions of the star-branched polymers of Examples 12–15 were prepared at concentrations such that the values of $KV_{100}$ of the solutions, which are an indication of the lubricating properties of the oils in actual operation, were fairly similar, viz., within the range of 10.0 to 11.0 cSt. The concentrations of polymer in the oil (conc.) and the viscometric properties of the solutions are shown in Table V.

TABLE V

| Example | Conc, wt. % | $KV_{40}$, cSt | $KV_{100}$, cSt | VI | RTP |
|---|---|---|---|---|---|
| 12 | 4.02 | 45.7 | 10.0 | 215 | 7.2 |
| 13 | 2.94 | 46.7 | 10.5 | 223 | 10.2 |
| 14 | 2.00 | 46.6 | 10.8 | 233 | 15.5 |
| 15 | 1.80 | 47.2 | 11.0 | 233 | 17.4 |

The results of Table V indicate that the higher the $M_n$ of the star-branched polymer of this invention, the lower the amount necessary in a lubricating oil to achieve a desired level of viscometric properties.

We claim:

1. A star-branched polymer made by a process comprising contacting an anionically polymerizable monomer consisting of monoethylenically unsaturated monomers comprising at least 50 wt. % of p-tert-butylstyrene (t-BS) with an anionic polymerization catalyst to form living polymer anions and coupling said living polymer anions with a polyalkenyl coupling agent, said living polymer anions having a number average molecular wight (Mn) in the range of about 10,000 to 50,000.

2. The star-branched polymer of claim 1 wherein said monomer consists of t-BS.

3. The star-branched polymer of claim 1 wherein said coupling agent is divinylbenzene (DVB).

4. The star-branched polymer of claim 1 wherein the molar ratio of said living polymer anions to said coupling agent is about 1 to 24.

5. The star-branched polymer of claim 1 wherein after said coupling reaction, an additional amount of said monomer is added for continued reaction with said coupling agent.

TABLE IV

| Example | An. Pol Init. Sol, ml. | Theo. $M_n$ | No. Arms, approx | $M_w$ | $M_n$ | MWD | $KV_{40}$, cSt | $KV_{100}$, cSt | VI | RTP |
|---|---|---|---|---|---|---|---|---|---|---|
| F | 0.92 | 50 M | | 77 M | 60 M | 1.28 | 38.1 | 7.8 | 181 | 4.2 |
| 12 | 0.92 | 50 M/arm | 7 | 660 M | 420 M | 1.57 | 58.6 | 12.6 | 220 | 7.1 |
| G | 0.46 | 100 M | | 130 M | 110 M | 1.23 | 49.7 | 10.1 | 196 | 5.8 |
| 13 | 0.46 | 100 M/arm | 5 | 950 M | 480 M | 1.98 | 89.8 | 19.1 | 235 | 9.7 |
| H | 0.31 | 150 M | | 280 M | 220 M | 1.27 | 77.3 | 15.5 | 214 | 8.4 |
| 14 | 0.31 | 150 M/arm | 3 | 1,300 M | 570 M | 2.34 | 159.7 | 33.0 | 251 | 13.1 |
| I | 0.23 | 200 M | | 360 M | 270 M | 1.37 | 96.7 | 19.4 | 223 | 9.8 |
| 15 | 0.23 | 200 M/arm | 3 | 1,400 M | 770 M | 1.78 | 194.7 | 39.7 | 256 | 14.3 |

* * * * *